United States Patent [19]
Obertegger et al.

[11] Patent Number: 5,634,608
[45] Date of Patent: Jun. 3, 1997

[54] TAKE-UP APPARATUS FOR REEL MATERIAL

[75] Inventors: Franz Obertegger; Mario Gandini, both of Brixen, Italy

[73] Assignee: Durst Phototechnik AG, Brixen, Italy

[21] Appl. No.: 528,931

[22] Filed: Sep. 15, 1995

[30] Foreign Application Priority Data

Sep. 19, 1994 [IT] Italy ................................ BZ94A0057

[51] Int. Cl.⁶ .................................................. B65H 23/10
[52] U.S. Cl. ................................ 242/413.2; 242/419.1; 242/534
[58] Field of Search ........................ 242/412, 412.1, 242/412.2, 412.3, 413.3, 413.4, 413.5, 413.6, 534, 534.1, 534.2, 535, 535.1, 535.2, 535.3, 419, 419.1; 355/27, 72

[56] References Cited

U.S. PATENT DOCUMENTS

| | | |
|---|---|---|
| 3,547,369 | 12/1970 | Potucek . |
| 3,603,522 | 9/1971 | Herrmann ........................ 242/419 |
| 3,715,087 | 2/1973 | Schmidt ........................... 242/534 |
| 4,025,005 | 5/1977 | Fleck et al. ..................... 242/412.2 |
| 4,447,016 | 5/1984 | Enberg et al. .................. 242/413.3 |
| 4,469,291 | 9/1984 | Treiber et al. .................. 242/412.2 |
| 4,504,026 | 3/1985 | Serizawa et al. ............... 242/535.1 |
| 4,544,110 | 10/1985 | Nagel et al. .................... 242/534 |
| 4,990,949 | 2/1991 | Tomizawa ....................... 242/412 |
| 4,996,541 | 2/1991 | Mori et al. ...................... 242/413.3 |
| 5,117,241 | 5/1992 | Stephenson ..................... 346/1.1 |
| 5,176,334 | 1/1993 | Dreschau et al. . |
| 5,284,305 | 2/1994 | Gassmann . |

FOREIGN PATENT DOCUMENTS

| | | |
|---|---|---|
| 476418 | 3/1992 | European Pat. Off. . |
| 485140 | 5/1992 | European Pat. Off. . |
| 707730 | 7/1931 | France . |
| 3116041 | 11/1982 | Germany . |
| 2 103 188 | 2/1983 | United Kingdom ............. 242/413.5 |
| 90/05690 | 5/1990 | WIPO . |

Primary Examiner—John P. Darling
Attorney, Agent, or Firm—Fitch, Even, Tabin & Flannery

[57] ABSTRACT

A take-up apparatus for reel material of an image exposing device has a driven winding drum and a sensor provided to control the drive of the winding drum. The sensor detects the position of the reel material ahead of the winding drum. In this case, the drive of the winding drum is controlled in such a manner that the reel material forms a bulge (A) ahead of the winding drum with a substantially constant curvature.

20 Claims, 2 Drawing Sheets

TAKE-UP APPARATUS FOR REEL MATERIAL

BACKGROUND OF THE INVENTION

The present invention relates to a take-up apparatus for reel material, in particular for an image exposing device having a driven winding drum.

Such an apparatus is known from EP-0 463 997. In this known take-up apparatus, two pivotable guiding members are provided which guide the reel or tape material about a hollow cylindrical guiding shell which is insertable onto a rotatably supported, driven winding core. The guiding shell is capable of being engaged in its operating position.

Basically, in take-up apparatus for reel material, there exists the problem that the material must be taken-up as uniformly as possible without damaging the material and without producing kinks, folds or the like. However, particularly in the case of working wide reel material, for example of the order of magnitude of 1300 mm, small irregularities occur during take-up.

The present invention is therefore based on the problem (object) to further develop a take-up apparatus for reel material having a driven winding drum in such a manner that the reel material is perfectly uniformly taken-up on the winding drum, in particular when this has a larger width of, for example, 1300 mm.

SUMMARY OF THE INVENTION

This object is solved by means of the features of the patent claims and in particular in that a sensor is provided which controls the drive of the winding drum and which detects the position of the reel material ahead of the winding drum.

The winding drum can be controlled in such a manner by means of the inventive solution that the reel material always takes up a certain position ahead of the winding drum, which can ensue by accelerating or retarding the drive of the winding drum. In this manner, it is ensured that the reel material has a small tension which remains the same between the position of the sensor and the winding core, on account of which irregularities are prevented during take-up.

According to an advantageous embodiment of the invention, a curving out of the reel material is capable of being detected by the sensor. It has in fact been surprisingly shown that the reel material can be particularly uniformly taken-up when this forms a "bulge" ahead of the winding drum. In this case, the formation of the bulge can be detected by the sensor, which in turn appropriately controls the drive of the winding drum so that such a bulge is always formed.

According to a further embodiment of the invention, the reel material can be guided in a substantially vertical direction to the winding drum. It has also been shown in this case that this measure improves the uniform take-up on the winding core of the winding drum. In this case, depending on the diameter of the winding, the reel material can be guided at an angle of 80° –100° to the horizontal. At the beginning of the take-up process, an angle of approximately 100° is formed with the horizontal which reduces with an increasing winding diameter so that an angle of approximately 80° to the horizontal is obtained in the case of a completely taken-up winding.

According to another embodiment of the invention, the sensor of the take-up apparatus can have a rocking arm which may be provided with a spring. At its one end, such a rocking arm can detect the bulge of the reel material to be formed, the other end coacting with the sensor. In this case, the reel material can be scanned, without influencing it, by using a spring with an appropriately small spring force.

According to an even further embodiment, the sensor, which may for example have a bifurcated light barrier, can output an analog output signal. In this manner, the particular advantage is achieved that the output signal of the sensor receives information on the magnitude of the spacing of the reel material from the sensor. Thus, the drive of the winding drum can be particularly sensitively regulated.

According to a further embodiment, a deflecting device, for example in the form of a free running roller, can be arranged above the winding drum for the reel material. It can be achieved by means of this measure that the bulge can be formed along a defined path, namely between the deflecting direction and the winding core. This also contributes to a uniform take-up.

According to a further embodiment of the invention, the sensor can be arranged on a moveable guiding element for the reel material. Such a moveable guiding element distances itself from the winding axis of the winding drum with an increasing winding diameter.

In so far as the sensor is arranged on this guiding element, the great advantage results that an increasing winding diameter does not influence the formation of the bulge of the reel material because the sensor has a constant distance to the outer periphery of the winding on account of its arrangement.

According to a further advantageous embodiment of the invention, the reel material can be guided ahead of the take-up by a braking device. In this manner, the uniformity of the transporting speed and of the take-up process is improved even more because the reel material can be guided in a controlled manner. If the braking device has an eddy current brake, the particularly significant advantage of a completely smooth and stutter-free movement of the reel material results because no discontinuities or irregularities enter into the system on account of the use of the eddy current brake since this produces a constant braking moment in contrast, for example, to a direct-current motor or the like.

An advantageous control of the inventive apparatus can be achieved in that the drive of the winding drum is controlled in such a manner that the reel material forms a bulge with an essentially constant curvature.

BRIEF DESCRIPTION OF THE FIGURES

The present invention is described by way of an exemplary embodiment with reference to the enclosed drawings, in which.

DETAILED DESCRIPTION OF THE INVENTION

Figure 1:
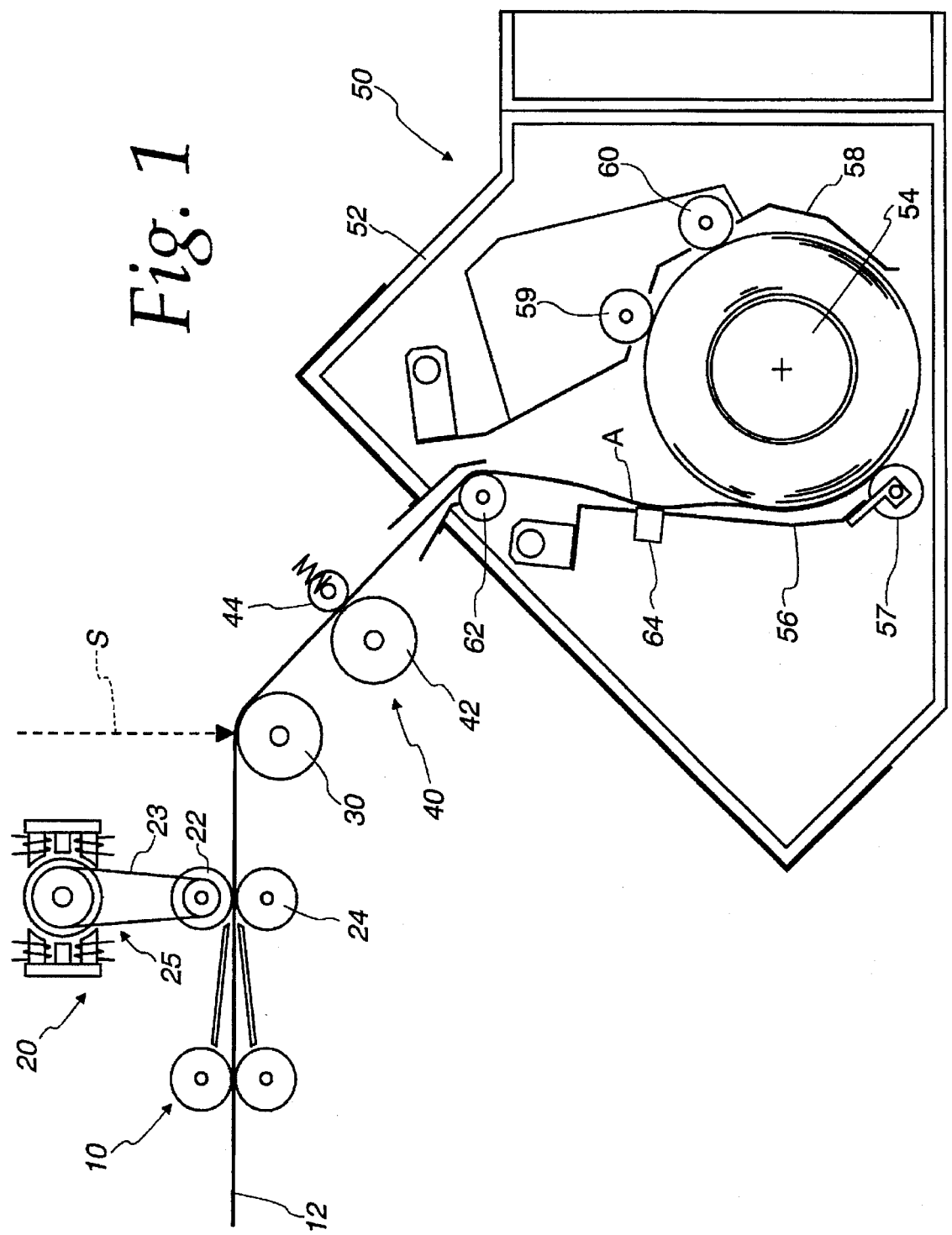
FIG. 1 shows a side view of an image exposing device with an inventive take-up apparatus.

The image exposing device illustrated in FIG. 1 consists basically of a schematically shown supplying device 10, a braking device 20, an exposing and deflecting roller 30, a drive 40 and a take-up unit 50. A cutting device, not shown, is provided between the braking device 20 and the roller 30.

The schematically illustrated supplying device 10 includes a roller pair as well as various guiding and deflecting plates which enable a controlled feed of the reel material, for example a paper web of photographic paper.

The braking device 20 has a braking roller 22 and a counterpressure roller 24 between which the paper web 12 is guided. The braking roller 22 is connected by means of a belt 23 transmission with an eddy current brake 25. In this case, the braking force can be controlled by means of the intensity of the eddy current.

The exposing and deflecting roller 30 serves on the one hand to provide a uniform support for the paper web so that an incoming exposure beam S can illuminate the paper web without irregularities occurring. On the other hand, the paper web is deflected at an angle of approximately 40° downwards by the roller 30.

The paper web is subsequently guided through the drive means 40 which has a driven roller 42 and a counterpressure means 44. The counterpressure means 44 consists in this case of several individually sprung rollers on account of which a distortion- and shift-free drive of the paper web is achieved.

Following passage through the drive means 40, the paper web 12 arrives in the take-up apparatus 50 which is arranged in a housing 52.

The take-up apparatus 50 has a driven winding drum 54, the drive of the winding drum not being shown. Additionally, two pivotably supported guide plates 56 and 58 are arranged in the housing 52 which ensure uniform take-up. The guide plate 56 has a roller 57 at its forward end that rolls on the winding which is being formed. In a similar manner, the guide plate 58 is provided with two rollers 59 and 60 which ensure automatic take-up on the winding drum 54.

In the region of the supply opening, the take-up apparatus 50 has a deflection roller 62 which deflects the paper web 12 into an essentially vertical direction.

Approximately in the middle between the deflection roller 62 and the outer periphery of the winding drum 54, there is a sensor 64 mounted on the guide plate 56.

Figure 2:
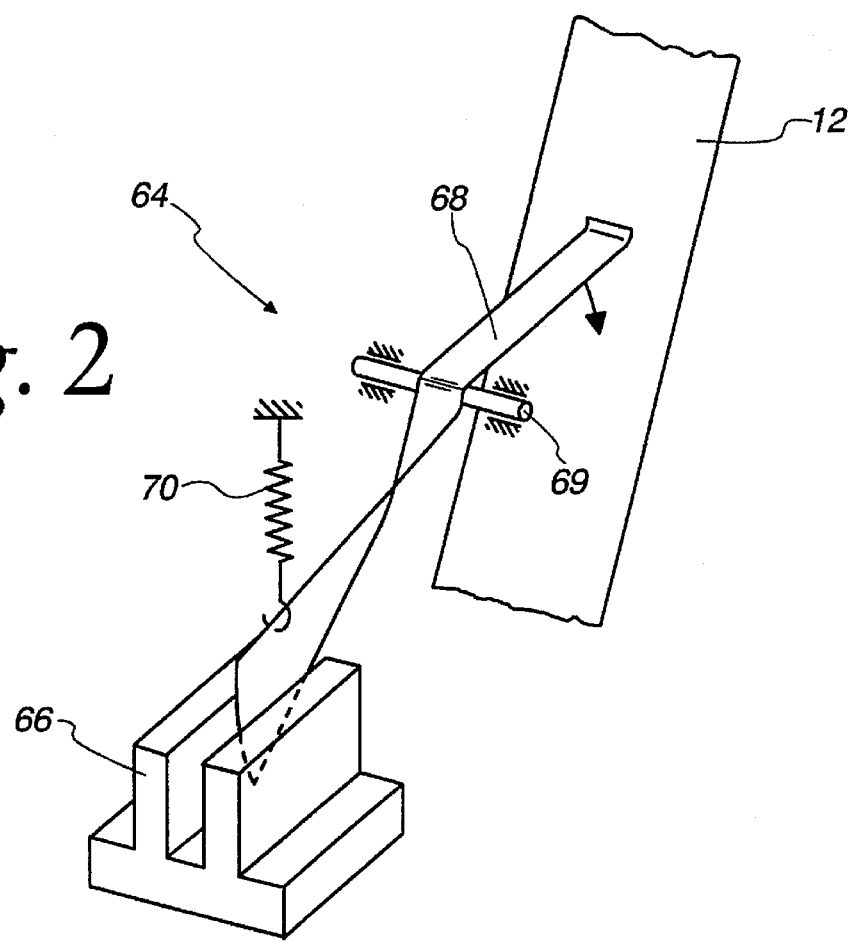
FIG. 2 shows a schematic illustration of a sensor which detects the position of the reel material.

FIG. 2 schematically shows the design of the sensor 64 which has a bifurcated light barrier 66 as well as a rocking arm 68. The rocking arm 68 is supported at a bracket 69 and is tensioned by a spring 70. Here, the right-hand end of the rocking arm 68 in FIG. 2 detects the position of the paper web 12, the left-hand end of the rocking arm 68 in FIG. 2 coacting with the bifurcated light barrier 66.

Figure 3:
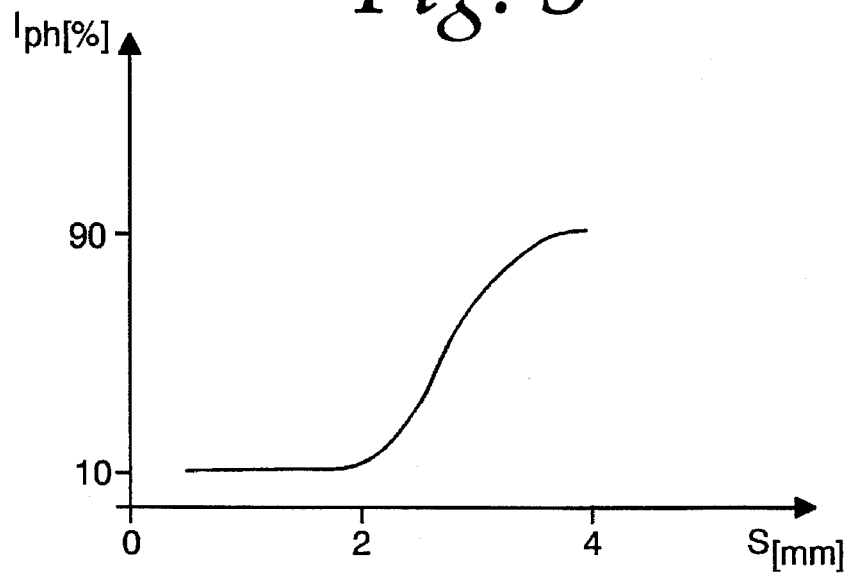
FIG. 3 shows a diagram which illustrates the dependence of the output signal of the sensor on the spacing of the reel material.

The characteristic curve of the sensor 64 of FIG. 2 is illustrated in FIG. 3. As can be seen, the photoelectric current of the bifurcated light barrier 66 receives information on the magnitude of the distance of the paper web 12 from the sensor 64. In this manner, the distance to the paper web 12 can be determined without difficulty in a range of approximately 2 mm by means of the magnitude of the generated photoelectric current. Since the rocking arm 68 is formed to be angular, the releasing or triggering distance can be adjusted by the selection of the leverage ratio.

In the following, the mode of operation of the above-described image exposing device and the inventive take-up apparatus is described.

At the beginning of the exposure process, the paper web 12 is fed by the supplying device 10 and arrives in the braking device 20. Subsequently, the paper web 12 is guided over the exposure roller 30 and the drive device 40 into the take-up apparatus 50. On account of the guide plates 56 and 58 provided in this location as well as the rollers 57, 59 and 60 connected with these, the beginning of the paper web is automatically taken up on the winding drum when the drive device 40 as well as the drive of the winding drum 54 are actuated.

In the following exposing procedure, the drive device 40 is actuated and pulls the paper web 12 over the exposure roller 30, the braking device 20 in cooperation with the provided eddy current brake ensuring an absolutely shift-free rolling of the paper web. During transport of the paper, the exposure beam S is directed onto the paper web 12 and is deflected perpendicularly to the paper web. In this case, the drive of the deflecting mirror for the exposure beam S is connected with the step motor of the drive device 40 in order to obtain a synchronization between the longitudinal movement of the paper web and the transverse movement of the exposure beam S. Thus, the tolerances of the drive of the deflection mirror are compensated and possibly occurring image distortions are prevented.

During take-up, the sensor 64 detects the position of the paper web 12 ahead of the winding drum 54. In this case, the drive of the winding drum 54 is controlled in such a manner that the paper web 12 forms a constant bulge A which essentially maintains the same curvature, on account of which a perfectly uniform take-up is ensured. During this, the regulation of the drive of the winding drum 54 takes place by means of the output signal of the sensor 64 which receives information on the spacing of the bulge A from the sensor 64. In this manner, a very sensitive and smooth regulation is achieved.

Since the drive means 40 is arranged near the exposure roller 30 and the take-up apparatus 50 is arranged near the drive device 40, the paper losses arising when changing the paper selected are extremely small.

We claim:

1. A take-up apparatus for reel material comprising a driven winding drum and a sensor for controlling the drive of the winding drum and for detecting a bulging of the reel material ahead of the winding drum, wherein the apparatus is effective for guiding the reel material in a substantially vertical direction to the winding drum.

2. An apparatus according to claim 1 which is effective for guiding the reel material at an angle of 80° to 100° to the horizontal depending on the diameter of the winding.

3. An apparatus according to claim wherein the sensor has a rocking arm.

4. An apparatus according to claims 3 wherein the rocking arm is tensioned with a spring.

5. An apparatus according to claim 1 or 3 wherein the sensor outputs a digital output signal.

6. An apparatus according to claim 5 wherein the sensor includes a bifurcated light barrier.

7. An apparatus according to claim 1 or 3 wherein the sensor includes a bifurcated light barrier.

8. An apparatus according to claim 1 or 3 wherein the sensor outputs an analog output signal.

9. An apparatus according to claim 1 wherein a deflecting device for the reel material is arranged above the winding drum.

10. An apparatus according to claim 9 wherein the sensor is arranged between the deflecting device and the winding drum.

11. An apparatus according to claims 7 wherein the deflecting device is a free running roller.

12. An apparatus according to claim 1 wherein the reel material is guided through a braking device before the take-up.

13. An apparatus according to claim 12 wherein the braking device has an eddy current brake.

14. An apparatus according to claim 12 or 13 wherein the braking device has two rollers.

15. A method of controlling an apparatus according to claim 1 wherein the drive of the winding drum is controlled in such a manner during take-up that the reel material forms a bulge ahead of the winding drum with a substantially constant curvature.

16. An apparatus according to claim 1 which is employed in an image exposing device.

17. An apparatus according to claim 1 further comprising at least one movable guide element for the reel material.

18. An apparatus according to claim 17 wherein the movable guide element comprises at least one roller.

19. An apparatus according to claim 17 or 18 wherein the sensor is arranged on the movable guide element.

20. An image exposing device having a take-up apparatus for feel material according to claim 1, 2, 3, 9, 10, 12, 13, 6, 17, 18, 4, or 11.

* * * * *